US009958607B2

(12) United States Patent
Yanagisawa

(10) Patent No.: US 9,958,607 B2
(45) Date of Patent: May 1, 2018

(54) LIGHT WAVEGUIDE, METHOD OF MANUFACTURING LIGHT WAVEGUIDE, AND LIGHT WAVEGUIDE DEVICE

(71) Applicant: SHINKO ELECTRIC INDUSTRIES CO., LTD., Nagano-shi, Nagano (JP)

(72) Inventor: Kenji Yanagisawa, Nagano (JP)

(73) Assignee: SHINKO ELECTRIC INDUSTRIES CO., LTD., Nagano-Shi (JP)

( * ) Notice: Subject to any disclaimer, the term of this patent is extended or adjusted under 35 U.S.C. 154(b) by 0 days. days.

(21) Appl. No.: 15/365,294

(22) Filed: Nov. 30, 2016

(65) Prior Publication Data
US 2017/0160468 A1 Jun. 8, 2017

(30) Foreign Application Priority Data
Dec. 3, 2015 (JP) .................................. 2015-236270

(51) Int. Cl.
| G02B 6/12 | (2006.01) |
| G02B 6/122 | (2006.01) |
| G02B 6/132 | (2006.01) |
| G02B 6/30 | (2006.01) |

(52) U.S. Cl.
CPC ............. *G02B 6/122* (2013.01); *G02B 6/132* (2013.01); *G02B 6/305* (2013.01); *G02B 2006/12111* (2013.01)

(58) Field of Classification Search
CPC .. G02B 6/1228; G02B 6/121; G02B 6/12016; G02B 6/305; G02B 2006/121; G02B 2006/12176; G02B 2006/12195; G02B 6/14; G02B 6/30; G02B 2006/12147; G02B 2006/12152
See application file for complete search history.

(56) References Cited

U.S. PATENT DOCUMENTS

| 5,142,596 | A  * | 8/1992 | Mizuuchi | G02B 6/1228 359/326 |
| 6,200,502 | B1 * | 3/2001 | Paatzsch | G02B 6/30 205/70 |
| 6,304,706 | B1 * | 10/2001 | Sugita | G02B 6/12011 385/129 |
| 6,317,445 | B1 * | 11/2001 | Coleman | H01S 5/22 372/45.01 |
| 6,571,039 | B1 * | 5/2003 | Al-hemyari | G02B 6/1228 385/131 |
| 6,760,529 | B2 * | 7/2004 | Chong | G02B 6/1228 385/129 |
| 6,819,839 | B2 * | 11/2004 | Zheng | G02B 6/42 257/431 |
| 6,993,225 | B2 * | 1/2006 | Patel | G02B 6/42 385/30 |

(Continued)

FOREIGN PATENT DOCUMENTS

| JP | 2002-267859 | 9/2002 |
| JP | 2007-094389 | 4/2007 |

*Primary Examiner* — Rhonda Peace
(74) *Attorney, Agent, or Firm* — Rankin, Hill & Clark LLP

(57) ABSTRACT

A light waveguide includes a first cladding layer, a groove formed in the first cladding layer, a core layer embedded in the groove, and a second cladding layer formed on the first cladding layer and the core layer. A width and thickness of one end of the core layer are larger than a width and thickness of the other end of the core layer.

9 Claims, 14 Drawing Sheets

(56) References Cited

U.S. PATENT DOCUMENTS

| | | | |
|---|---|---|---|
| 7,650,052 B2* | 1/2010 | Krishnamoorthy | G02B 6/12007 385/14 |
| 8,121,450 B2* | 2/2012 | Webster | G02B 6/32 385/33 |
| 8,126,301 B2* | 2/2012 | Ishizaka | G02B 6/1228 216/51 |
| 8,718,432 B1* | 5/2014 | Heideman | G02B 6/1228 216/13 |
| 9,310,555 B2* | 4/2016 | Sun | G02B 6/14 |
| 9,310,558 B2* | 4/2016 | Huang | G02B 6/26 |
| 9,335,475 B2* | 5/2016 | Ono | G02B 6/34 |
| 2001/0026670 A1* | 10/2001 | Takizawa | G02B 6/1228 385/129 |
| 2003/0033975 A1* | 2/2003 | Bazylenko | G02B 6/122 117/84 |
| 2003/0108319 A1* | 6/2003 | Chong | G02B 6/1228 385/129 |
| 2007/0117280 A1 | 5/2007 | Lee et al. | |
| 2012/0156369 A1* | 6/2012 | Kim | G02B 6/12002 427/163.2 |

\* cited by examiner

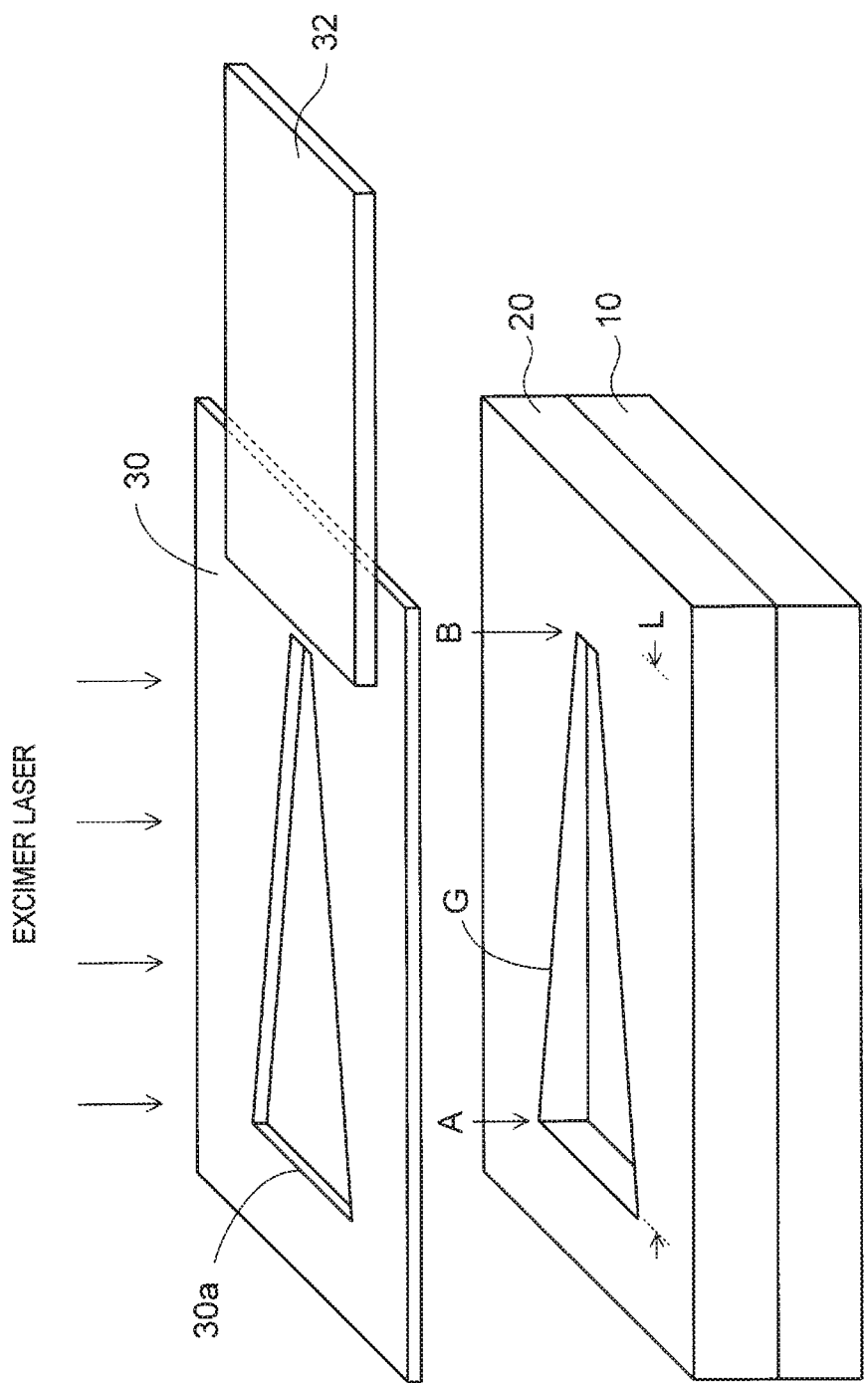

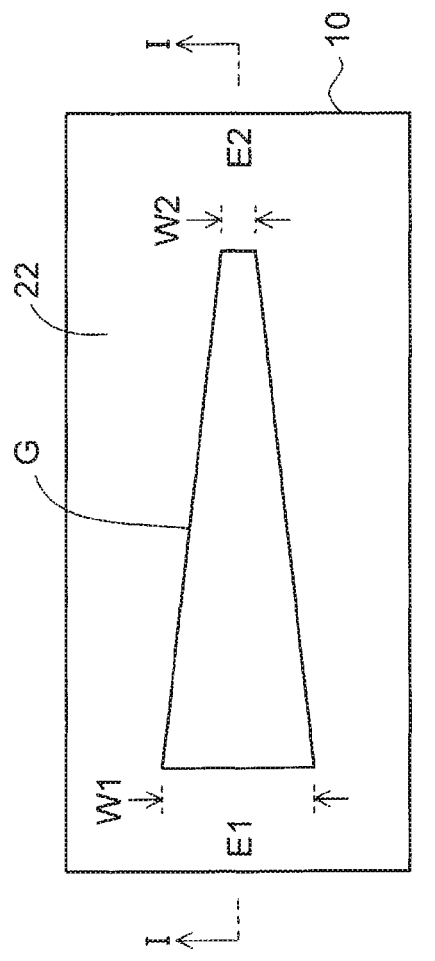
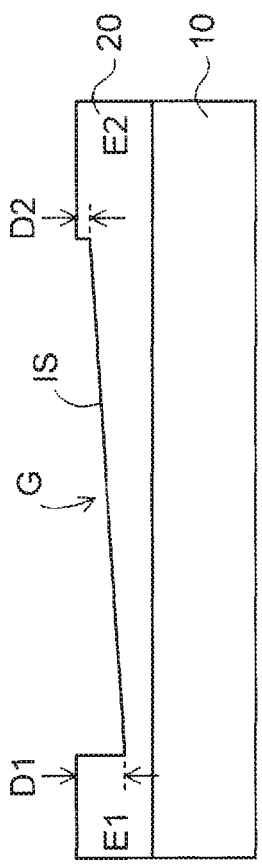
FIG. 5A (PLAN VIEW)
FIG. 5B (CROSS-SECTIONAL VIEW)

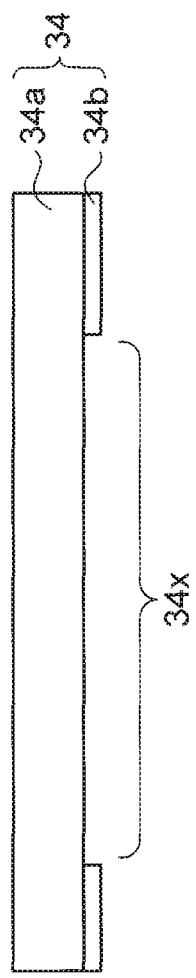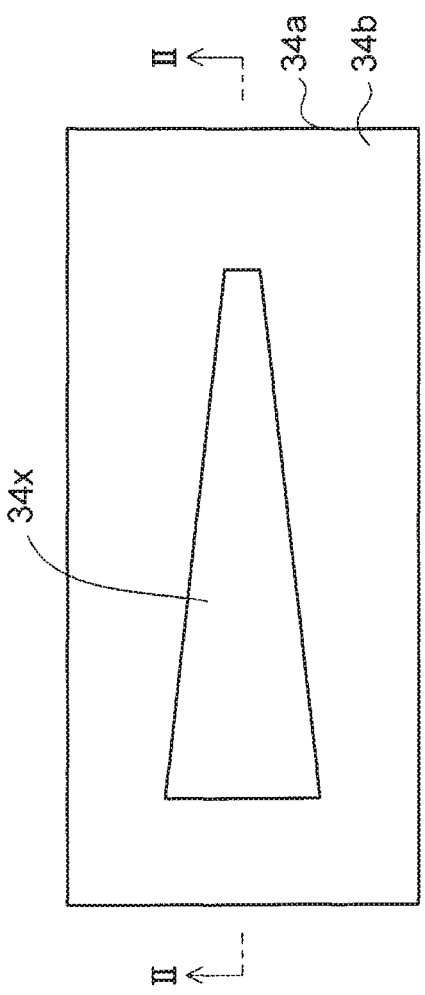
FIG. 6A
FIG. 6B

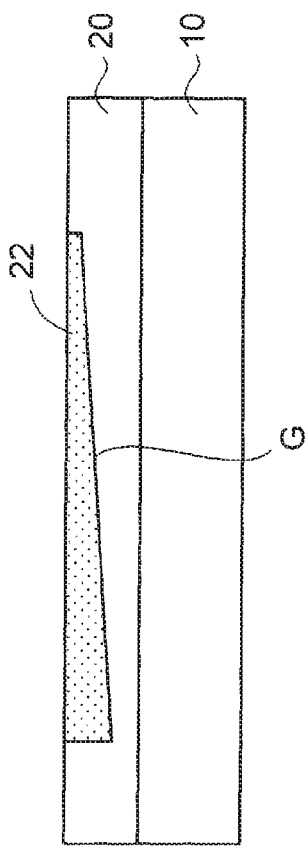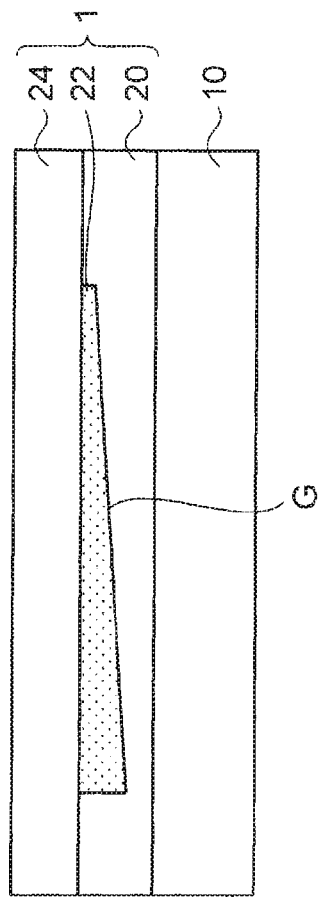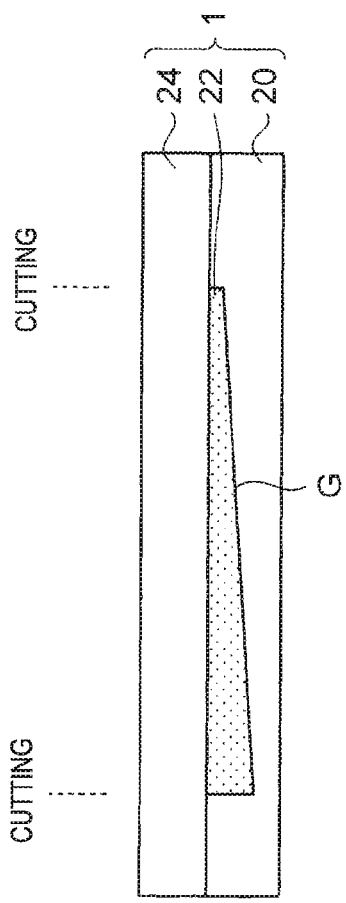

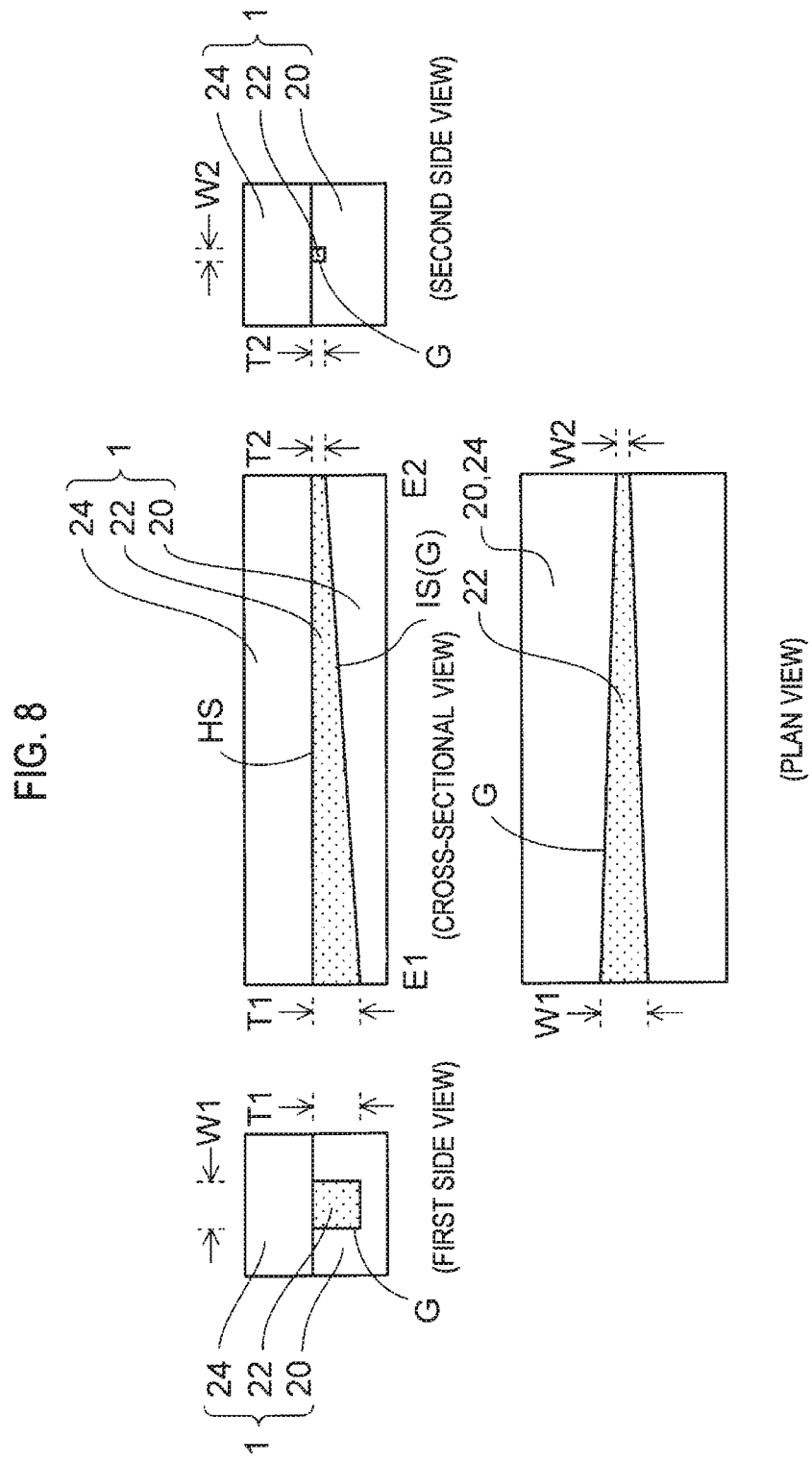

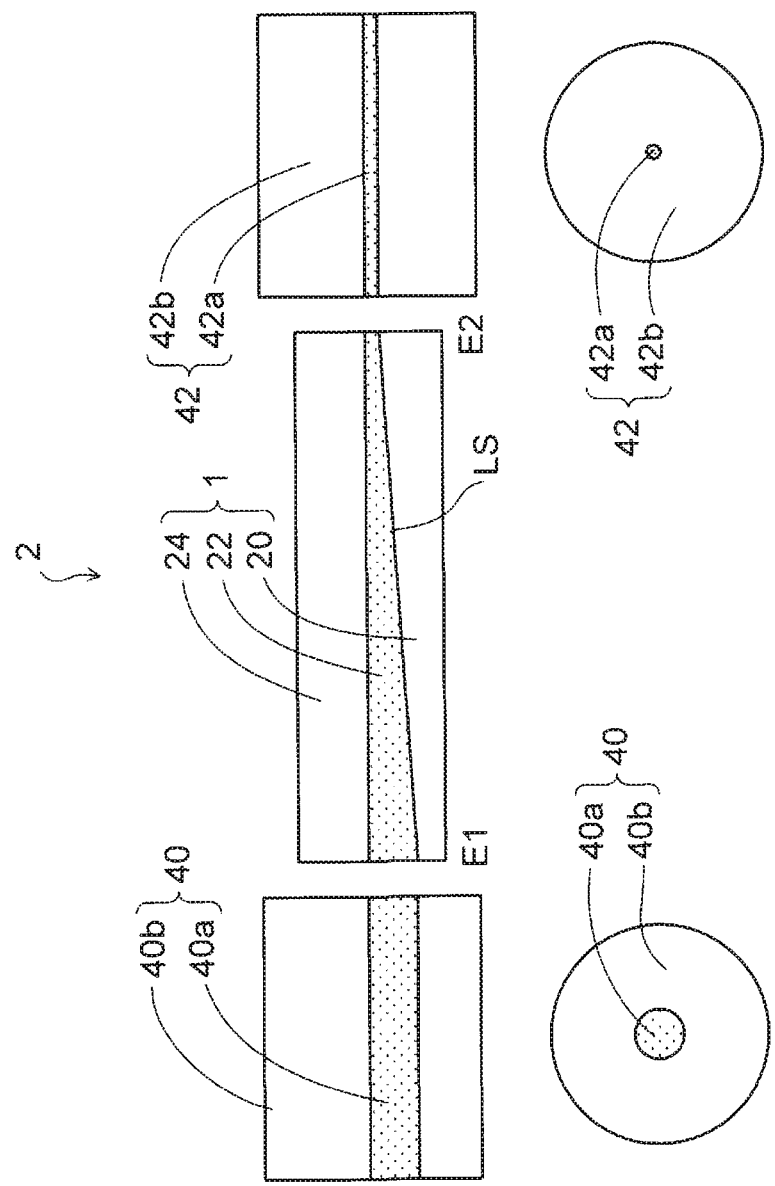

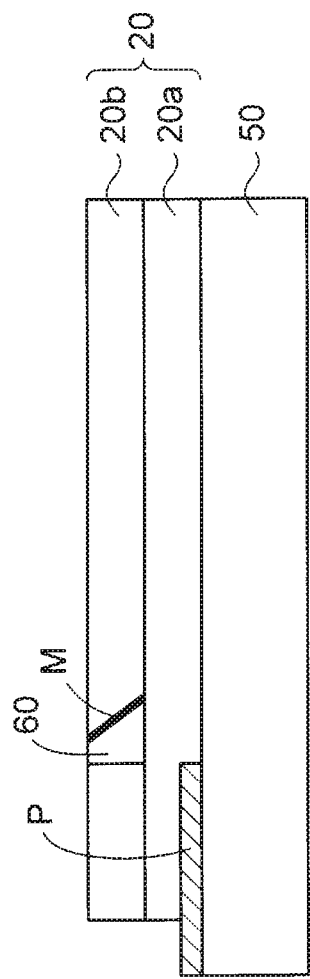
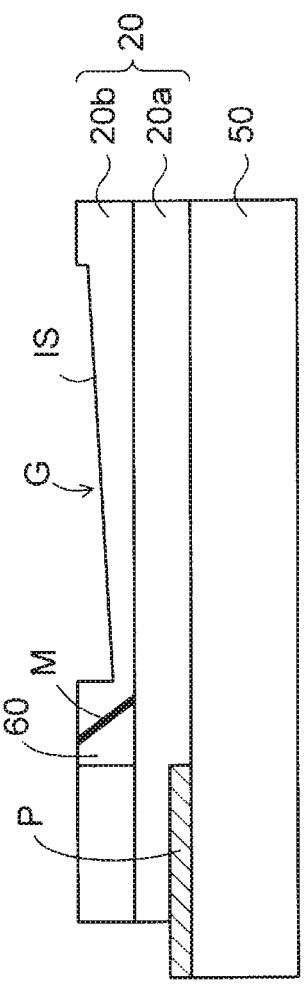
FIG. 11A
FIG. 11B

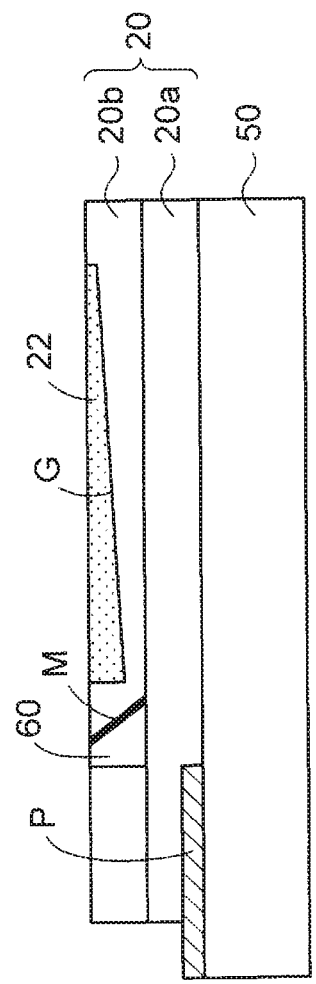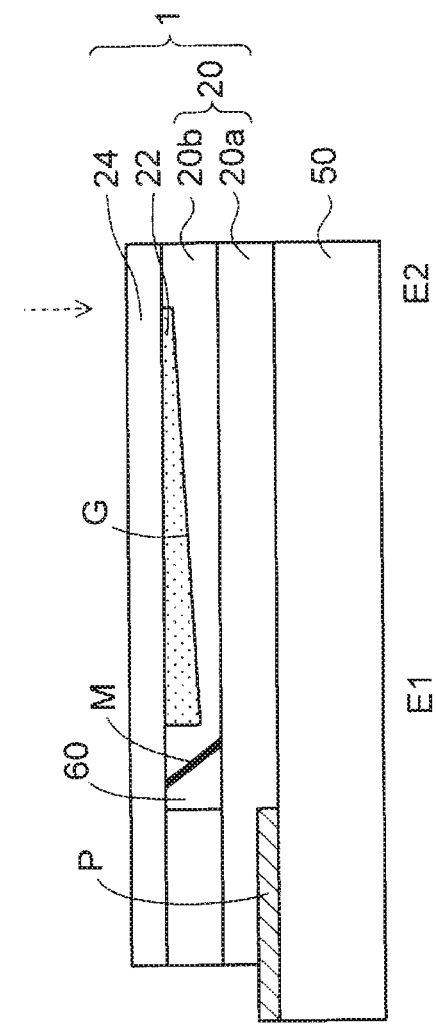
FIG. 12A
FIG. 12B

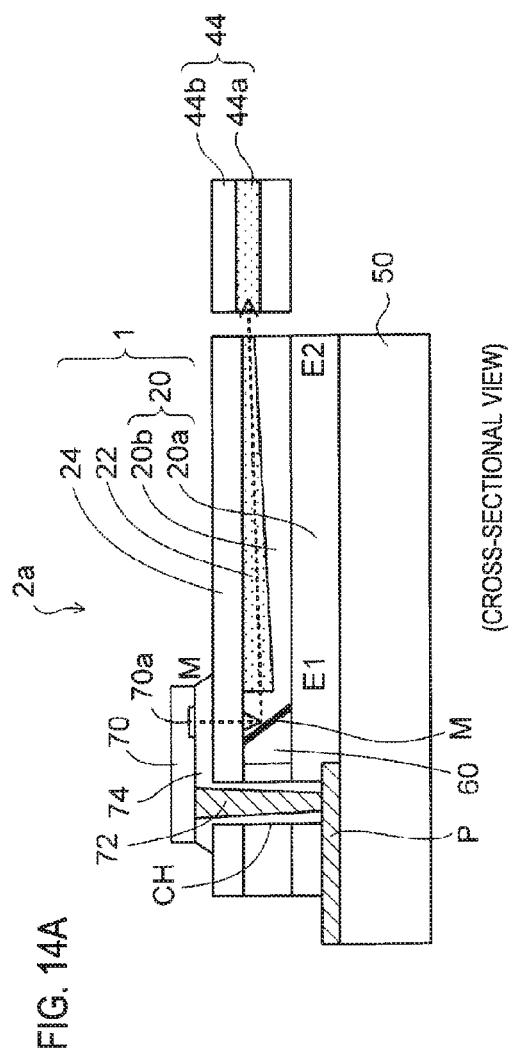
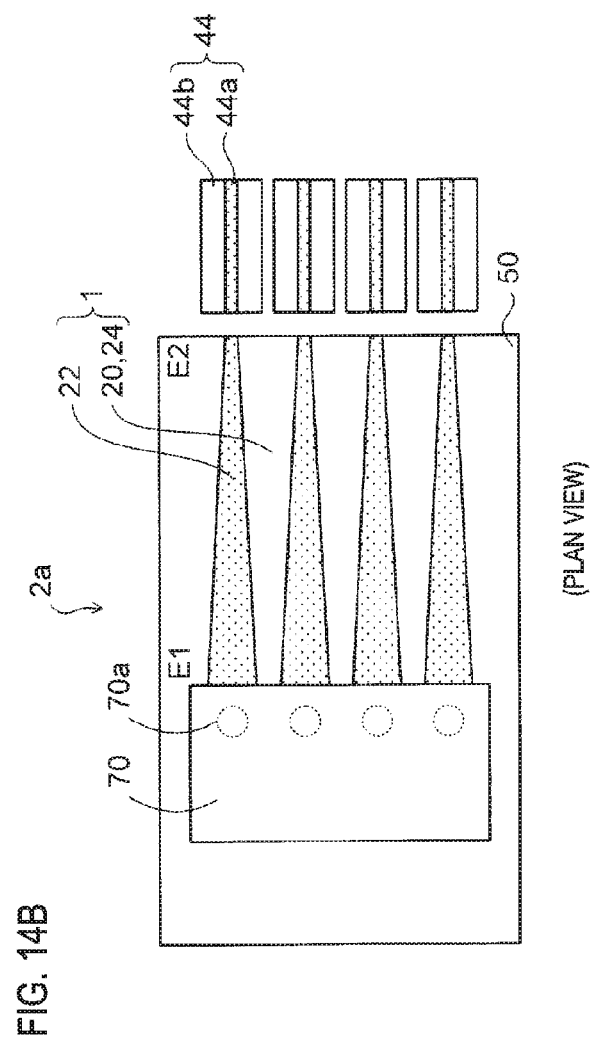

LIGHT WAVEGUIDE, METHOD OF MANUFACTURING LIGHT WAVEGUIDE, AND LIGHT WAVEGUIDE DEVICE

CROSS-REFERENCE TO RELATED APPLICATION

The present application claims priority from Japanese Patent Application No. 2015-236270 filed on Dec. 3, 2015, the entire content of which is incorporated herein by reference.

BACKGROUND

Technical Field

The present invention relates to a light waveguide, a method of manufacturing the light waveguide, and a light waveguide device.

Related Art

In the related art, there are light waveguide devices configured to have light waveguides for transmitting light signals formed on wiring substrates for transmitting electric signals. The light waveguide devices are photoelectric substrates, and can transmit light signals at high-speed in order to compensate the transmission speed limitation of electric signals.

On end sides of the light waveguides, light path conversion mirrors are disposed, and optical elements are mounted on the wiring substrates so as to be optically coupled with the light path conversion mirrors of the light waveguides.
[Patent Document 1] Japanese Patent Application Publication No. 2002-267859
[Patent Document 2] Japanese Patent Application Publication No. 2007-94389

A light waveguide has a structure in which a core layer is surrounded by a lower cladding layer and an upper cladding layer, and the core layer is formed by patterning a photosensitive resin film on the basis of photolithography.

The cross section sizes of the core layers depend on the thicknesses of resin films, and the thickness limitation of resin films is about 10 μm. For this reason, it is difficult to form core layers having small cross section sizes in a range between 1 μm×1 μm and 3 μm×3 μm.

Therefore, it is impossible to easily meet the demand for manufacturing a light waveguide having a core layer having a difference in the cross section size between the light input side and the light output side.

SUMMARY

Exemplary embodiments of the invention provide a light waveguide having a novel structure in which the cross section size of a core layer on the light input side is different from that on the light output side, a method of manufacturing the light waveguide, and a light waveguide device.

A light waveguide comprises:
a first cladding layer;
a groove formed in the first cladding layer;
a core layer embedded in the groove; and
a second cladding layer formed on the first cladding layer and the core layer,
wherein a width and thickness of one end of the core layer are larger than a width and thickness of the other end of the core layer.

A light waveguide device comprises:
a light waveguide which includes a first cladding layer, a groove formed in the first cladding layer, a core layer embedded in the groove, and a second cladding layer formed on the first cladding layer and the core layer, and in which a width and thickness of one end of the core layer are larger than a width and thickness of the other end of the core layer;
a first optical fiber or an optical element optically coupled with the one end of the core layer of the light waveguide; and
a second optical fiber optically coupled with the other end of the core layer.

A method of manufacturing a light waveguide, comprises:
forming a first cladding layer on a substrate;
forming a groove in the first cladding layer such that a width and depth of one end are larger than a width and depth of the other end;
forming a core layer in the groove such that the core layer is embedded; and
forming a second cladding layer on the first cladding layer and the core layer,
wherein a width and thickness of the one end of core layer are larger than a width and thickness of the other end of the core layer.

According to the following disclosure, in a light waveguide, a core layer is embedded in a groove formed in a first cladding layer, and on the core layer, a second cladding layer is formed. Further, the cross section sizes of both ends of the core layer are different from each other, and the width and thickness of one end of the core layer is set to be larger than the width and thickness of the other end of the core layer.

The cross section sizes of both ends of the core layer can be adjusted by changing the widths and thicknesses of both ends of the groove which is formed in the first cladding layer. Therefore, it is possible to easily manufacture the light waveguide having the core layer having a difference in the cross section size between the light input side and the light output side.

Since it is possible to reduce the cross section sizes of the core layer as compared to the method of forming a core layer from a resin film, it is possible to optically couple an optical fiber or the like having a small core diameter with the light waveguide with low loss.

BRIEF DESCRIPTION OF THE DRAWINGS

FIG. 4 is a perspective view illustrating a fourth portion of the method of manufacturing the light waveguide of the first embodiment.

FIGS. 5A and 5B are a cross-sectional view and a plan view illustrating a fifth portion of the method of manufacturing the light waveguide of the first embodiment, respectively.

FIGS. 6A and 6B are a cross-sectional view and a plan view illustrating a sixth portion of the method of manufacturing the light waveguide of the first embodiment, respectively.

FIGS. 7A to 7C are cross-sectional views illustrating a seventh portion of the method of manufacturing the light waveguide of the first embodiment.

FIG. 8 is a cross-sectional view, a plan view, and side views illustrating the light waveguide of the first embodiment.

FIG. 9 is a cross-sectional view illustrating a light waveguide device using the light waveguide of the first embodiment.

FIGS. 11A and 11B are cross-sectional views illustrating a second portion of the method of manufacturing the light waveguide of the second embodiment.

FIGS. 12A and 12B are cross-sectional views illustrating a third portion of the method of manufacturing the light waveguide of the second embodiment.

FIGS. 14A and 14B are cross-sectional views illustrating a light waveguide device using the light waveguide of the second embodiment.

DETAILED DESCRIPTION

Hereinafter, embodiments will be described with reference to the accompanying drawings.

First Embodiment

FIGS. 1 to 7C are views for explaining a method of manufacturing a light waveguide of a first embodiment, and FIG. 8 is a view illustrating the light waveguide of the first embodiment, and FIG. 9 is a view illustrating a light waveguide device using the light waveguide of the first embodiment.

Hereinafter, with a description of the method of manufacturing the light waveguide, the structures of the light waveguide and the light waveguide device will be described.

Figure 1:
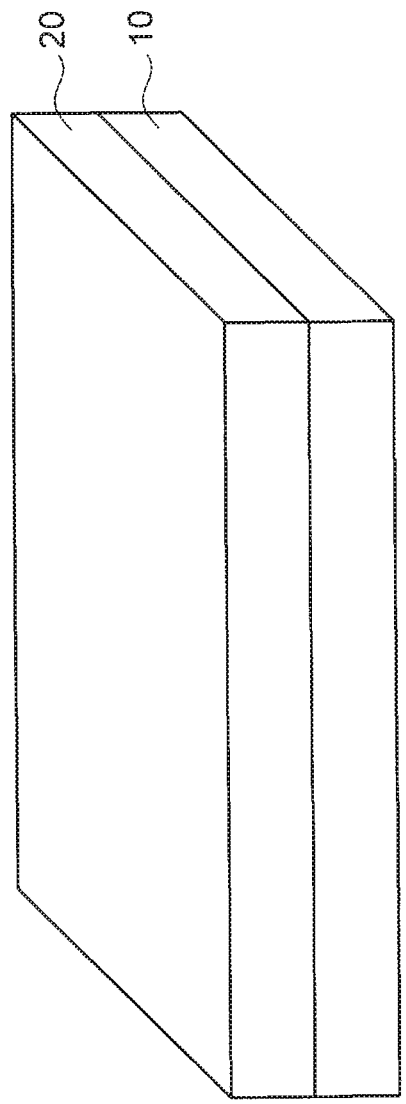
FIG. 1 is a perspective view illustrating a first portion of a method of manufacturing a light waveguide of a first embodiment.

In the method of manufacturing the light waveguide of the first embodiment, first, as shown in FIG. 1, a substrate 10 is prepared, and on the substrate 10, a first cladding layer 20 is formed. In FIGS. 1 to 8, an area of a light waveguide formation area on the substrate 10 where one core layer is disposed is partially shown.

In the first embodiment, the substrate 10 is prepared as a temporal substrate to be finally removed, and is made of a material which can be removed by ripping, such as a polycarbonate resin or polyethylene terephthalate (PET).

The first cladding layer 20 is formed of a resin layer of an epoxy resin or the like. In a case of forming the first cladding layer 20 on the light waveguide formation area of the substrate 10 by patterning, a photosensitive resin layer is patterned on the basis of photolithography. The thickness of the first cladding layer 20 is, for example, about 10 μm to 30 μm.

Figure 2:
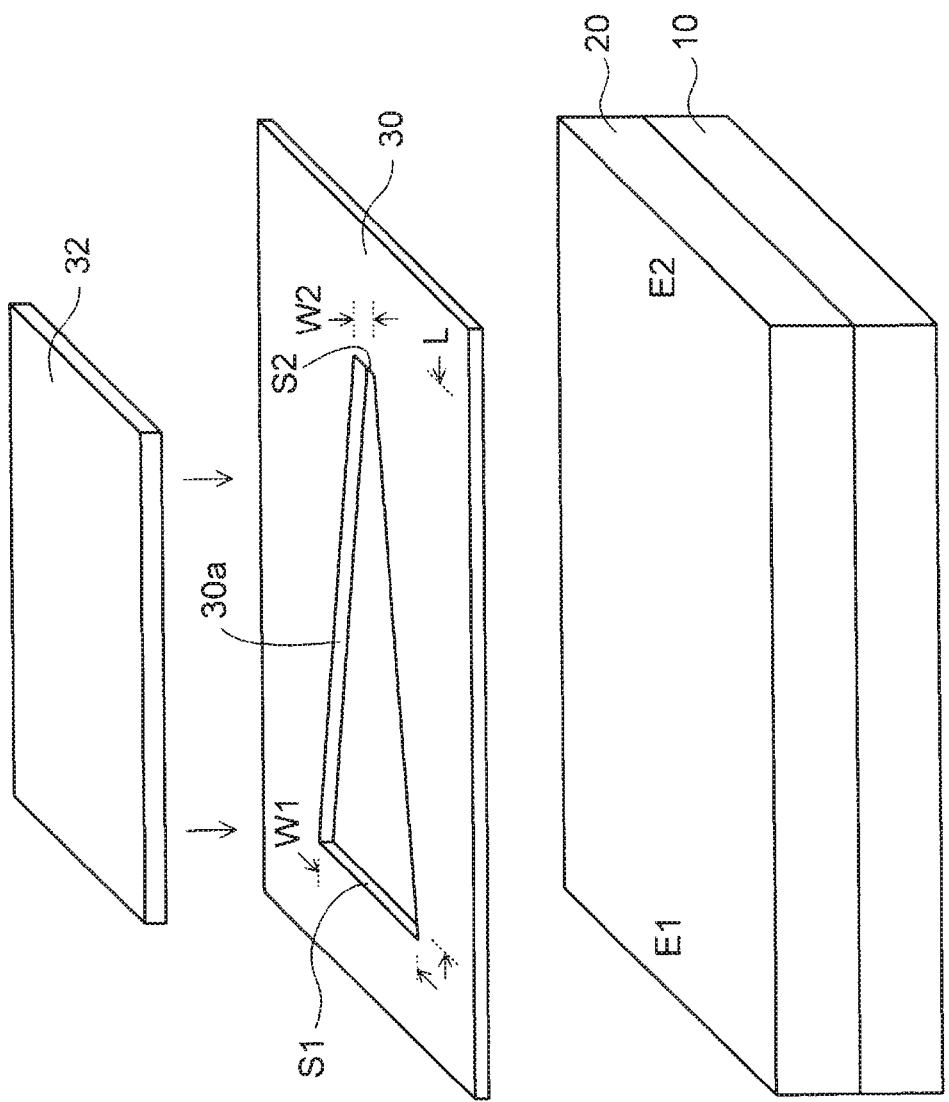
FIG. 2 is a perspective view illustrating a second portion of the method of manufacturing the light waveguide of the first embodiment.

Subsequently, as shown in FIG. 2, a metal mask 30 and a shield plate 32 are prepared. The metal mask 30 is formed from a stainless steel plate or the like. The metal mask 30 has an opening as a light-passing part 30a at the center.

The metal mask 30 is used as a mask during irradiation with a laser, and irradiation with the laser is performed through the light-passing part 30a.

Also, the shielding plate 32 is disposed on the metal mask 30, and is used to partially shield the light-passing part 30a of the metal mask 30 from the laser. The shielding plate 32 is formed from a stainless steel plate or the like.

As will be described below, irradiation with the laser is performed while the shielding plate 32 is moved in the longitudinal direction of the light-passing part 30a of the metal mask 30 such that the light-passing part 30a of the metal mask 30 is gradually exposed. Also, in the first cladding layer 20, a groove is formed by laser processing, and a core layer is formed so as to be embedded in the groove.

In the present embodiment, the core layer is formed such that the cross section size of one end of the core layer is different from the cross section size of the other end. To this end, the width and thickness of one end E1 of the core layer is set to be larger than the width and thickness of the other end E2.

In order to form this core layer, the width W1 of one end E1 of the light-passing part 30a of the metal mask 30 is set to be larger than the width W2 of the other end E2. The light-passing part 30a of the metal mask 30 is formed such that its planar shape becomes a longitudinal isosceles trapezoid shape having a lower side S1 and an upper side S2 and having the same internal angle at both ends of the lower side S1.

For example, the width W1 of the lower side S1 of one end E1 of the light-passing part 30a of the metal mask 30 is set to 30 μm, and the width W2 of the upper side S2 of the other end E2 is set to 1 μm, and the length L of the light-passing part is set to 2000 μm.

As described above, the metal mask 30 having the light-passing part 30a having the longitudinal shape in which the width W1 of one end E1 is larger than the width W2 of the other end E2 is prepared.

The width of the core layer which is finally obtained is determined on the basis of the width of the light-passing part 30a of the metal mask 30. Also, the thickness of the core layer is determined on the basis of the depth of the groove which is formed in the first cladding layer 20.

As will be described below, in order to make the depth of one end E1 of the groove deeper than the depth of the other end E2, the shielding plate 32 is moved on the metal mask 30 during irradiation with the laser such that an exposure area of the light-passing part 30a varies.

Figure 3:
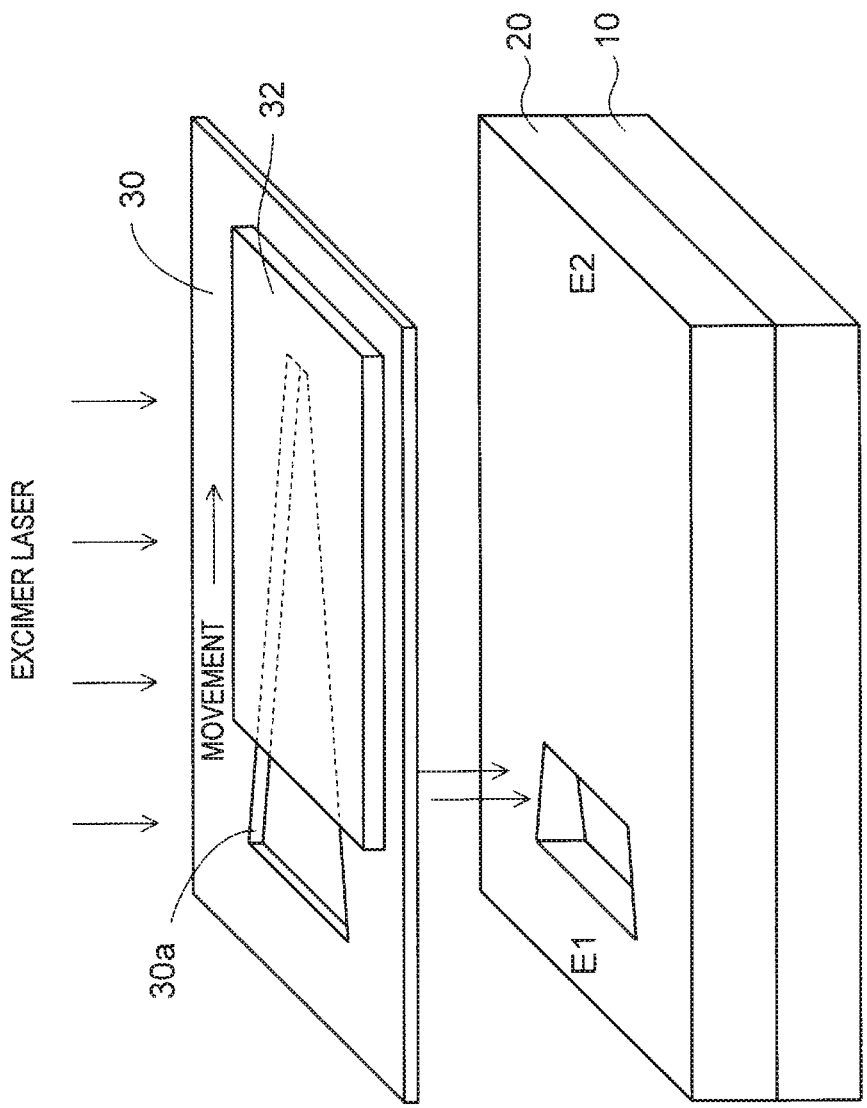
FIG. 3 is a perspective view illustrating a third portion of the method of manufacturing the light waveguide of the first embodiment.

More specifically, as shown in FIG. 3, first, as the laser, a KrF excimer laser having a wavelength (λ) of 248 nm is used. The excimer laser is capable of performing surface processing on a surface area of 3 mm×3 mm at one time by irradiation with a laser beam.

Therefore, it is possible to process the first cladding layer 20 by irradiating the whole of the light-passing part 30a of the metal mask 30 described above with the laser at once.

In the process setting, in the first cladding layer 20, the groove is formed such that the depth of one end E1 is deeper than the depth of the other end E2.

First, as shown in FIG. 2, the whole of the light-passing part 30a of the metal mask 30 is shielded by the shielding plate 32. Subsequently, as shown in FIG. 3, irradiation with the excimer laser is performed while the shield plate is moved at a constant speed from one end of the light-passing part 30a of the metal mask 30 toward the other end.

At this time, the first cladding layer 20 is irradiated with the excimer laser through a portion of the light-passing part 30a exposed from the shielding plate 32, whereby the first cladding layer 20 is processed in the thickness direction.

Irradiation with the excimer laser is performed while the shielding plate 32 is continuously moved at the constant speed until the whole of the light-passing part 30a of the metal mask 30 is exposed as shown in FIG. 4.

At this time, the processing rate of the excimer laser is 0.1 µm per one shot, and the excimer laser is controlled such that the number of shots of the excimer laser at a processing start point position "A" of the first cladding layer 20 becomes 300. Therefore, the depth at the position "A" of the first cladding layer 20 becomes 30 µm (0.1 µm×300).

Also, the excimer laser is controlled such that the number of shots of the excimer laser at a processing finish point position "B" of the first cladding layer 20 becomes 10. Therefore, the depth at the finish point position "B" of the first cladding layer 20 becomes 10 µm (0.1 µm×10).

The movement speed of the shielding plate 32 in a case where the length L of the groove which is formed in the first cladding layer 20 is 2000 µm and the frequency of a processing pulse of the excimer laser is 100 Hz (the number of shots per one second is 100) is calculated as follows.

In this case, since the number of shots of the excimer laser is 290 (2.9 seconds), and the shielding plate 32 needs to move by 2000 µm, the movement speed of the shielding plate 32 is set to 690 µm/sec (2000 µm/2.9 seconds).

In the above-described way, in the surface of the first cladding layer 20, a groove G is formed. The plan view of FIG. 5A is a plan view illustrating the first cladding layer 20 of FIG. 4, and the cross-sectional view of FIG. 5 is a cross-sectional view taken along a line I-I of FIG. 5A.

The groove G is formed in the first cladding layer 20 as shown in FIG. 5A such that its planar shape becomes a longitudinal isosceles trapezoid shape corresponding to the light-passing part 30a of the metal mask 30 described above. The width W1 of one end E1 of the graph screen G is set to be larger than the width W2 of the other end E2.

For example, the width W1 of one end E1 of the groove G is 30 µm, and the width W2 of the other end E2 is 1 µm.

Also, as shown in the cross-sectional view of FIG. 5B, the depth D1 of one end E1 of the groove G which is formed in the first cladding layer 20 is set to be deeper than the depth D2 of the other end E2. For example, the depth D1 of one end E1 of the groove G is 30 µm, and the depth D2 of the other end E2 is 1 µm.

Therefore, the groove G is formed such that its bottom surface becomes such an inclined surface IS that the height position gradually gets higher as it goes from one end E1 toward the other end E2.

In this way, the groove G is formed such that the width W1 and depth D1 of one end E1 are larger than the width W2 and depth D2 of the other end E2.

In the example of FIG. 5B, the bottom surface of the groove G is the inclined surface IS over all. Besides this example, the groove G may be formed such that its bottom surface becomes a horizontal surface between one end E1 and an intermediate position and becomes a similar inclined surface IS from the intermediate position toward the other end E2.

In this case, in the process of FIGS. 3 and 4 described above, irradiation with the excimer laser needs to start in a state where the left half area of the light-passing part 30a of the metal mask 30 is exposed from the shielding plate 32, and be performed while the shielding plate 32 is moved similarly.

Like this, the whole or a part of the bottom surface of the groove G may be inclined such that the width and depth of one end E1 of the groove G become larger than the width and depth of the other end E2.

Also, in FIGS. 3 and 4 described above, irradiation with the excimer laser is performed through the opening formed as the light-passing part 30a in the metal mask 30.

As shown in FIGS. 6A and 6B, instead of the metal mask 30, a glass mask 34 may be used. The cross-sectional view of FIG. 6A corresponds to a cross section taken along a line II-II of the plan view of FIG. 6B.

The glass mask 34 has a light shielding layer 34b formed of a chrome layer on the lower surface of a transparent glass substrate 34a. In this case, an exposed part of the glass substrate 34a becomes a light-passing part 34x. The light-passing part 34x of the glass mask 34 is disposed in an area corresponding to the light-passing part 30a of the metal mask 30 described above.

While the shielding plate 32 is moved similarly in FIGS. 3 and 4 described above, the first cladding layer 20 is irradiated through the light-passing part 34x of the glass mask 34 by the excimer laser, whereby it is possible to form a groove G having the same shape.

As described above, a mask which is used during irradiation with the excimer laser needs to have a light-passing part allowing laser beams to pass and a light shielding part, and various masks can be used.

Next, a liquid resin such as an epoxy resin as shown in FIG. 7A is filled in the groove G of the first cladding layer 20, and is heated at a temperature of about 140° C., thereby hardening.

In this way, a core layer 22 is formed so as to be embedded in the groove G of the first cladding layer 20. The width and thickness of the core layer 22 are the same as the width and depth of the groove G of the first cladding layer 20.

Subsequently, on the first cladding layer 20 and the core layer 22, a second cladding layer 24 is formed as shown in FIG. 7B.

The second cladding layer 24 is formed of a resin layer of an epoxy resin or the like. Similarly to the first cladding layer 20, in a case of forming the second cladding layer 24 by patterning, the second cladding layer 24 is formed of a photosensitive resin layer. The thickness of the second cladding layer 24 is, for example, 10 µm to 30 µm.

The refractive index of the core layer 22 is set to be higher than the refractive indexes of the first cladding layer 20 and the second cladding layer 24.

Therefore, a light waveguide 1 is formed by the first cladding layer 20, the core layer 22, and the second cladding layer 24.

Subsequently, the substrate 10 is ripped off from the first cladding layer 20 of the light waveguide 1, whereby the substrate 10 is removed as shown in FIG. 7C. Then, cutting is performed from the upper surface of the second cladding layer 24 to the lower surface of the first cladding layer 20, whereby each light waveguide area is obtained.

Alternatively, in order to obtain each light waveguide area, it is possible to cut the structure of FIG. 7B from the upper surface of the second cladding layer 24 to the lower surface of the substrate 10, and then remove the substrate 10.

In the above-described way, as shown in FIG. 8, the light waveguide 1 of the first embodiment is obtained.

As shown in a cross-sectional view of FIG. 8, the light waveguide 1 of the first embodiment is constructed by forming the first cladding layer 20, the core layer 22, and the second cladding layer 24 in order from the bottom. Also, the light waveguide 1 has a structure in which the core layer 22 is surrounded by the first cladding layer 20 and the second cladding layer 24.

If first and second side views and a plan view of FIG. 8 are additionally referred to, the groove G is formed in the first cladding layer 20, and the core layer 22 is formed so as to be embedded in the groove G. The bottom surface of the groove G becomes such an inclined surface IS that the height position gets higher as it goes from one end E1 toward the other end E2.

Therefore, the thickness T1 of one end E1 of the core layer 22 is set to be larger than the thickness T2 of the other end E2. Also, as shown in the plan view of FIG. 8, the width W1 of one end E1 of the core layer 22 is set to be larger than the width W2 of the other end E2. In the plan view of FIG. 8, the second cladding layer 24 is shown in a perspective manner.

As described above, the cross section sizes of both ends of the core layer 22 of the light waveguide 1 of the present embodiment are different from each other. As shown in the first and second side views of FIG. 8, both of the width W1 and thickness T1 of one end E1 of the core layer 22 is set to be larger than the width W2 and thickness T2 of the other end E2.

For example, in the cross section size of one end E1 of the core layer 22, the width W1 is 30 µm, and the thickness T1 is 30 µm. Also, in the cross section size of the other end E2 of the core layer 22, the width W2 is 1 µm, and the thickness T2 is 1 µm.

In the present embodiment, by the above-described manufacturing method, the groove G is formed in the first cladding layer 20 such that the width and depth of one end E1 are different from those of the other end E2, and the core layer 22 is formed so as to be embedded in the groove G.

Therefore, it is possible to reduce the cross section sizes of the core layer as compared to the method of forming a core layer by patterning a photosensitive resin film by photolithography. In the case of using a photosensitive resin film, it is difficult to make a core layer thinner than the resin film (about 10 µm).

In the present embodiment, the cross section sizes of the core layer 22 are determined on the basis of the widths of the light-passing part 30a of the metal mask 30 described above, and the depths of the groove G which is formed in the first cladding layer 20 by laser processing.

Therefore, it is possible to easily form the core layer 22 such that the cross section size of one end E1 is different from that of the other end E2, by changing the widths and depths of one end E1 and the other end E2 of the groove G which is formed in the first cladding layer 20.

Therefore, it is possible to set the cross section sizes of the core layer 22 to small sizes in a range between 1 µm×1 µm and 3 µm×3 µm.

As described above, it is possible to easily manufacture the light waveguide 1 having the core layer 22 having a difference in the cross section size between the light input side and the light output side.

Also, the upper surface of the core layer 22 becomes a horizontal surface HS, and the second cladding layer 24 which is disposed on the core layer 22 is formed with the same thickness over all.

Therefore, even if the cross section sizes of both ends of the core layer 22 are different, the upper surface of the core layer 22 is disposed at the same height position as that of the related art. Therefore, even in a form in which a plurality of core layers 22 is disposed side by side, it is possible to easily and optically couple optical fibers and the like with them, without changing their specifications.

FIG. 9 shows a shape when optical fibers have been optically coupled with the light waveguide 1 of the first embodiment. As shown in FIG. 9, a first optical fiber 40 is optically coupled with one end E1 of the core layer 22, and a second optical fiber 42 is optically coupled with the other end E2 of the core layer 22. In this way, a light waveguide device 2 of the first embodiment is constructed.

The first optical fiber 40 is formed of a core 40a and a cladding layer 40b surrounding the core. Similarly, the second optical fiber 42 is formed of a core 42a and a cladding layer 42b surrounding the core.

The diameter of the core 42a of the second optical fiber 42 is set to be smaller than the diameter of the core 40a of the first optical fiber 40.

The first optical fiber 40 is a multi-mode fiber for short-distance transmission, and the diameter of the core 40a is about 50 µm. The cross section size of one end E1 of the core layer 22 of the light waveguide 1 is set to, for example, about 30 µm×30 µm such that the core layer can be optically coupled with the core 40a of the first optical fiber 40 with low loss.

Also, the second optical fiber 42 is a single-mode fiber for long-distance transmission, and the diameter of the core 42a is about 10 µm. The cross section size of the other end E2 of the core layer 22 of the light waveguide 1 is set to, for example, about 2 µm×2 µm such that the core layer can be optically coupled with the core 42a of the second optical fiber 42 with low loss.

As described above, in the light waveguide 1 of the present embodiment, it is possible to easily form the core layer 22 having a difference in the cross section size between one end E1 and the other end E2. Therefore, it is possible to optically couple the first optical fiber 40 and the second optical fiber 42 having the cores 40a and 40b having different diameters with the light waveguide 1 with low loss.

Therefore, it is possible to particularly reduce light loss of the optical coupling part of the second optical fiber 42 having the core 42a having a small diameter, and it is possible to obtain sufficient optical communication performance.

Alternatively, instead of the first optical fiber 40, an optical element may be optically coupled with one end E1 of the core layer 22 of the light waveguide 1. As the optical element, there is a light-emitting-element component such as a semiconductor laser element, or a light-receiving-element component such as a photodiode.

Besides the above-described forms, there is an optical device which is obtained by assembling an optical element such as a light emitting element or a light receiving element on a silicon substrate. In this optical device, a light emitting part or a light receiving part of the optical element is finely formed in a size of 2 µm to 3 µm.

In the present embodiment, since it is possible to adjust the cross section sizes of the core layer 22 of the light waveguide 1 to small sizes, it is possible to easily and optically the core layer even with an optical element of such an optical device.

For example, in FIG. 9, the other end E2 of the core layer 22 of light waveguide 1 having a small cross section size may be optically coupled with an optical element of an optical device.

Second Embodiment

FIGS. 10A to 14B are views for explaining a light waveguide device using a light waveguide of a second embodiment. In the above-described first embodiment, the light waveguide is formed on the substrate 10, and the substrate is removed from the light waveguide. In the second embodiment, the light waveguide is formed on a wiring substrate.

Figure 10A:
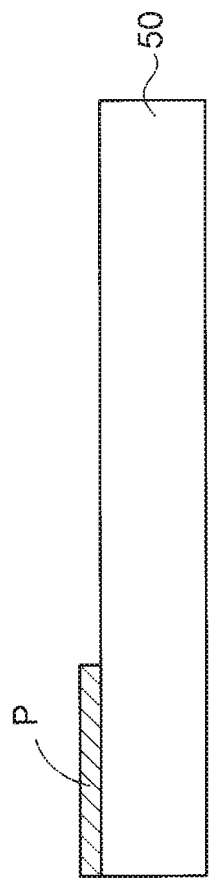
FIGS. 10A to 10C are cross-sectional views illustrating a first portion of a method of manufacturing a light waveguide of a second embodiment.

In the second embodiment, first, as shown in FIG. 10A, a wiring substrate 50 is prepared. The wiring substrate 50 has wiring layers configured to function as electric wiring lines, and pads P of the wiring layers are shown.

For example, the wiring substrate 50 has a plurality of wiring layers therein, and wiring layers positioned on both surface sides are connected by conductors formed in via holes. Also, the wiring substrate 50 may be a rigid substrate using a glass epoxy resin or the like as a base material, or may be a flexible substrate using a polyimide film as a base material.

Figure 10B:
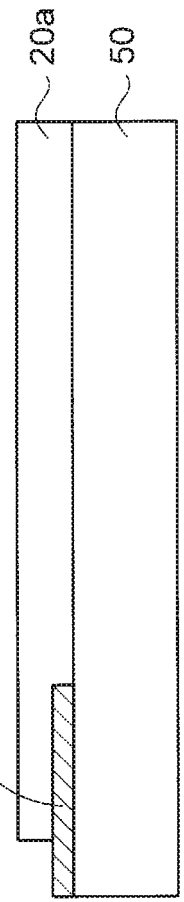

Next, on the wiring substrate 50, a lower cladding layer 20a is formed as shown in FIG. 10B by the same method as that in the process of FIG. 1 described above.

Figure 10C:
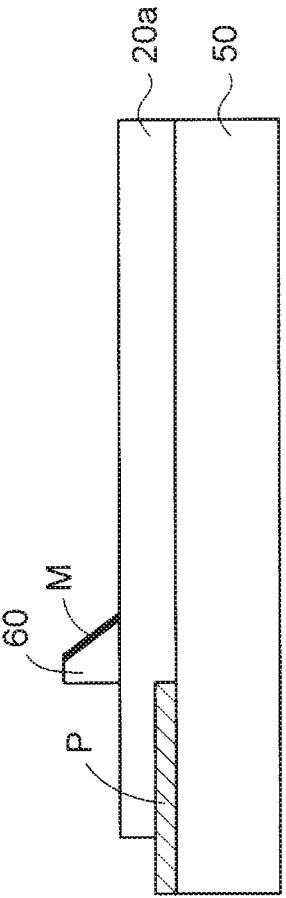

Subsequently, resin components 60 having inclined surfaces having an inclination angle of about 45° are prepared, and are fixed on the lower cladding layer 20a as shown in FIG. 10C by an adhesive (not shown). The resin components 60 are made by processing a resin material with a rotary blade and the like.

Subsequently, reflective metals and the like are formed on the inclined surfaces of the resin components 60 by evaporation using a mask, whereby light path conversion mirrors M are obtained. The light path conversion mirrors M are disposed on one end side of a light waveguide formation area.

Next, as shown in FIG. 11A, on the lower cladding layer 20a, an embedding cladding layer 20b is formed such that the light path conversion mirrors M are embedded therein. By the lower cladding layer 20a and the embedding cladding layer 20b, a first cladding layer 20 is formed.

Subsequently, in the first cladding layer 20, grooves G are formed as shown in FIG. 11B by the same method as that in the process of FIGS. 2 to 4 described above. The grooves G are formed such that their bottom surfaces become inclined surfaces IS like in FIG. 5B described above.

Subsequently, core layers 22 are formed similarly in the process of FIG. 7A described above so as to be embedded in the grooves G of the first cladding layer 20 as shown in FIG. 12A. Next, a second cladding layer 24 is formed on the first cladding layer 20 and the core layers 22 as shown in FIG. 12B, similarly in the process of FIG. 7B described above.

In this way, a light waveguide 1 is formed by the first cladding layer 20, the core layers 22, and the second cladding layer 24.

Then, cutting is performed from the upper surface of the second cladding layer 24 to the lower surface of the wiring substrate 50 such that the cross sections of the other ends E2 of the core layers 22 are exposed.

Figure 13:
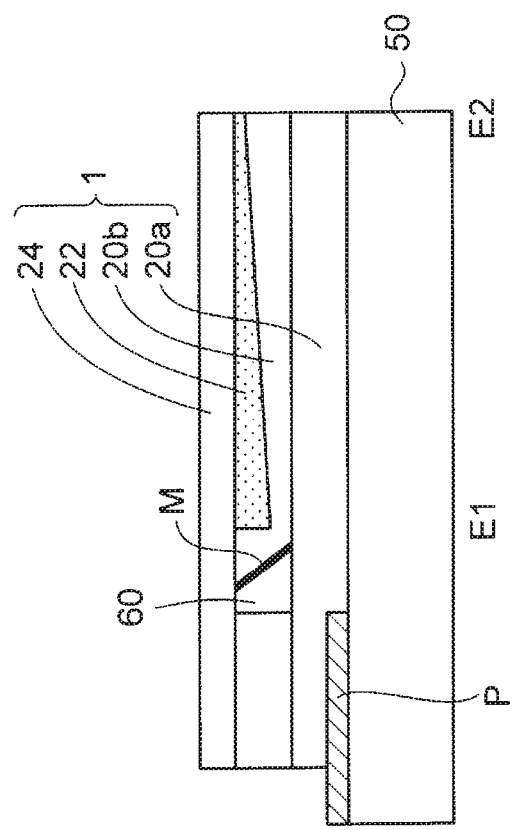
FIG. 13 is a cross-sectional view illustrating a shape when the light waveguide of the second embodiment has been formed on a wiring substrate.

In this way, on the wiring substrate 50, the light path conversion mirrors M and the light waveguide 1 are obtained as shown in FIG. 13. The light path conversion mirrors M and the ends E1 of the core layers 22 of the light waveguide 1 are disposed so as to be optically coupled with each other.

Even in the second embodiment, each core layer 22 of the light waveguide 1 is formed such that the cross section size of one end E1 is different from the cross section size of the other end. Also, the width and thickness of one end E1 of each core layer 22 having a larger cross section size are set to be larger than the width and thickness of the other end E2 of the corresponding core layer 22 having a smaller cross section size.

Next, as shown in the cross-sectional view of FIG. 14A, contact holes CH are formed to reach the pads P of the wiring substrate 50 by performing laser processing on the second cladding layer 24 and the first cladding layer 20.

Alternatively, it is possible to use photosensitive resin layers to form the first cladding layer 20 and the second cladding layer 24 described above, and form through-holes by photolithography, thereby forming the contact hole CH.

Next, a light emitting element 70 is prepared, and connection terminals 72 of the light emitting element 70 are connected to the pads P of the wiring substrate 50 exposed from the contact holes CH. Subsequently, interstices under the light emitting element 70 are filled with an underfill resin 74 from the contact holes CH.

As shown in the plan view of FIG. 14B, the light emitting element 70 is a vertical cavity surface emitting laser (VCSEL), and has a plurality of light emitting parts 70a formed on the lower surface.

Also, in the light waveguide 1 formed on the wiring substrate 50, the plurality of core layers 22 is disposed side by side in the horizontal direction so as to correspond to the plurality of light emitting parts 70a of the light emitting element 70. Horizontal surfaces IS (FIG. 8) which are the upper surfaces of the plurality of core layers 22 are disposed at the same height position. In the plan view of FIG. 14B, the second cladding layer 24 is shown in a perspective manner.

The light emitting element 70 is mounted such that each of the plurality of light emitting parts 70a is optically coupled with a light path conversion mirror M disposed on one end side of a corresponding core layer 22. Therefore, the plurality of light emitting parts 70a of the light emitting element 70 is optically coupled with the ends E1 of the plurality of core layers 22 of the light waveguide 1 through the light path conversion mirrors M, respectively.

The diameter of each light emitting part 70a of the light emitting element 70 is about 35 μm. The cross section sizes of the ends E1 of the core layers 22 of the light waveguide 1 are set to, for example, 30 μm×30 μm such that the core layers can be optically coupled with the light emitting parts 70a of the light emitting element 70 with low loss.

Also, optical fibers 44 are optically coupled with the other ends E2 of the plurality of core layers 22 of the light waveguide 1, respectively. The optical fibers 44 are formed by cores 44a and cladding layers 44b surrounding the cores.

The optical fibers 44 are single-mode fibers for long-distance transmission, and the size of each core 44a is about 10 μm. The cross section sizes of the other ends E2 of the core layers 22 of the light waveguide 1 are set to, for example, about 2 μm×2 μm such that the core layers can be optically coupled with the cores 44a of the optical fibers 44 with low loss.

In the above-described way, a light waveguide device 2a using the light waveguide 1 of the second embodiment is constructed.

In the light waveguide device 2a, as shown by an arrow path in the cross-sectional view of FIG. 14A, an electric signal output from an LSI chip (not shown) such as a driver is supplied to the light emitting element 70, and the light emitting element 70 emits light downward.

The light emitted from the light emitting element 70 reaches the light path conversion mirrors M through the underfill resin 74, the second cladding layer 24, and the first cladding layer 20. Then, the light is reflected by the light path conversion mirrors M, whereby the path of the light is converted by 90°, and enters the ends E1 of the core layers 22.

The light entering the core layers 22 is totally and repeatedly reflected, thereby propagating, and enters the cores 44a of the optical fibers 44 through the other ends E2 of the core layers 22.

In the second embodiment, the cross section sizes of the ends E1 of the core layers 22 which are optically coupled with the light emitting element 70 are set to be large on the basis of the light emitting parts 70a of the light emitting element 70. Also, the cross section sizes of the other ends E2 of the core layers 22 which are optically coupled with the single-mode optical fibers 44 are set to be small on the basis of the cores 44a of the optical fibers 44.

As described above, even in the second embodiment, in the light waveguide 1, it is possible to make a difference in the cross section size between the ends E1 and other ends E2 of the core layers 22, such that the core layers correspond to the optical element and the optical fiber to be optically coupled with them.

Therefore, even in a case where the sizes of the light emitting parts of the light emitting elements is different from the sizes of the cores of the optical fibers, it is possible to optically couple the light emitting elements and the optical fibers through the light waveguide 1 with low loss.

Alternatively, instead of the light emitting element 70, a light receiving element may be mounted. In this case, light propagates in the opposite direction to the above-described light path, and enters a light receiving part of the light receiving element.

What is claimed is:

1. A light waveguide comprising:
a first cladding layer;
a groove formed in the first cladding layer;
a core layer embedded in the groove; and
a second cladding layer formed on the first cladding layer and the core layer,
wherein a width and thickness of one end of the core layer are larger than a width and thickness of the other end of the core layer,
wherein an upper surface of the core layer is a horizontal surface, and a thickness of the second cladding layer along a direction crossing a light propagating direction is constant across an entire width of the second cladding layer, and
wherein the thickness of the second cladding layer is measured in a thickness direction between a first surface of the second cladding layer that faces the first cladding layer and a second surface of the second cladding layer opposite to the first surface, and the width of the second cladding layer is measured in a width direction perpendicular to the thickness direction and the light propagating direction.

2. The light waveguide according to claim 1, wherein:
a bottom surface of the groove is inclined, and
a depth of the groove where the one end of the core layer is disposed is deeper than the depth of the groove where the other end of the core layer is disposed.

3. The light waveguide according to claim 1, wherein:
a plurality of core layers is disposed side by side in a horizontal direction.

4. A light waveguide device comprising:
a light waveguide which includes a first cladding layer, a groove formed in the first cladding layer, a core layer embedded in the groove, and a second cladding layer formed on the first cladding layer and the core layer, and in which a width and thickness of one end of the core layer are larger than a width and thickness of the other end of the core layer, an upper surface of the core layer is a horizontal surface, and a thickness of the second cladding layer along a direction crossing a light propagating direction is constant across an entire width of the second cladding layer, wherein the thickness of the second cladding layer is measured in a thickness direction between a first surface of the second cladding layer that faces the first cladding layer and a second surface of the second cladding layer opposite to the first surface, and the width of the second cladding layer is measured in a width direction perpendicular to the thickness direction and the light propagating direction;
a first optical fiber or an optical element optically coupled with the one end of the core layer of the light waveguide; and
a second optical fiber optically coupled with the other end of the core layer.

5. A light waveguide device comprising:
a wiring substrate;
a light waveguide which is formed on the wiring substrate, and includes a first cladding layer, a groove formed in the first cladding layer, a core layer embedded in the groove, and a second cladding layer formed on the first cladding layer and the core layer, and in which a width and thickness of one end of the core layer are larger than a width and thickness of the other end of the core layer;
a light path conversion mirror optically coupled with the one end of the core layer of the light waveguide;
an optical element connected to the wiring substrate and optically coupled with the one end of the core layer through the light path conversion mirror; and
an optical fiber optically coupled with the other end of the core layer.

6. A method of manufacturing a light waveguide comprising:
forming a first cladding layer on a substrate;
forming a groove in the first cladding layer such that a width and depth of one end are larger than a width and depth of the other end;
forming a core layer in the groove such that the core layer is embedded; and
forming a second cladding layer on the first cladding layer and the core layer,
wherein a width and thickness of the one end of core layer are larger than a width and thickness of the other end of the core layer, and
wherein:
the forming the groove includes:
preparing a mask having a light-passing part having a longitudinal shape in which a width of one end is larger than a width of the other end, and a shield plate;
disposing the mask on the first cladding layer, and shielding the light-passing part of the mask with the shield plate; and
irradiating the first cladding layer with a laser through the light-passing part which is exposed from the shield plate while moving the shield plate at a constant speed from the one end of the light-passing part of the mask toward the other end.

7. The method of manufacturing a light waveguide according to claim 6, wherein:
an upper surface of the core layer becomes a horizontal surface, and a thickness of the second cladding layer on the core layer is constant.

8. The method of manufacturing a light waveguide according to claim 6, further comprising:
after forming the second cladding layer, removing the substrate.

9. The method of manufacturing a light waveguide according to claim 6, wherein:
the substrate is a wiring substrate.

* * * * *